United States Patent
Eklund, II et al.

(10) Patent No.: US 10,999,422 B2
(45) Date of Patent: May 4, 2021

(54) CONFIRMING GEOLOCATION OF A DEVICE

(71) Applicants: Sony Corporation, Tokyo (JP); Sony Pictures Entertainment Inc., Culver City, CA (US)

(72) Inventors: Don Charles Eklund, II, Culver City, CA (US); Eric Diehl, Culver City, CA (US)

(73) Assignees: Sony Corporation, Tokyo (JP); Sony Pictures Entertainment, Inc., Culver (CA)

( * ) Notice: Subject to any disclaimer, the term of this patent is extended or adjusted under 35 U.S.C. 154(b) by 176 days.

(21) Appl. No.: 16/265,581

(22) Filed: Feb. 1, 2019

(65) Prior Publication Data

US 2019/0349461 A1 Nov. 14, 2019

Related U.S. Application Data

(60) Provisional application No. 62/670,555, filed on May 11, 2018, provisional application No. 62/671,275, filed on May 14, 2018.

(51) Int. Cl.
*H04W 64/00* (2009.01)
*H04M 1/72403* (2021.01)
*H04W 4/02* (2018.01)
*G06K 19/06* (2006.01)

(52) U.S. Cl.
CPC ......... *H04M 1/72403* (2021.01); *H04W 4/02* (2013.01); *G06K 19/06037* (2013.01); *H04M 2250/52* (2013.01)

(58) Field of Classification Search
CPC ..... H04W 4/023; H04W 4/025; H04W 4/029; H04W 12/00503; H04W 28/0226; H04W 64/00; H04M 1/72572; H04M 2215/7259; H04M 3/42229; H04M 2242/30
USPC ................................ 455/404.2, 456.1–456.6
See application file for complete search history.

(56) References Cited

U.S. PATENT DOCUMENTS

| 5,999,171 A * | 12/1999 | Goff | G06F 3/0386 345/157 |
| 2006/0092274 A1* | 5/2006 | Good | H04N 7/18 348/61 |
| 2006/0094411 A1* | 5/2006 | Dupont | H04L 29/06027 455/417 |
| 2007/0067412 A1* | 3/2007 | Inui | G06F 16/9554 709/217 |

(Continued)

FOREIGN PATENT DOCUMENTS

JP 2011035622 A 2/2011

*Primary Examiner* — Rafael Pérez-Gutiérrez
*Assistant Examiner* — Xiang Zhang
(74) *Attorney, Agent, or Firm* — Procopio, Cory, Hargreaves & Savitch LLP

(57) ABSTRACT

Verifying that a first device is in a claimed location including: requesting the first device to display a device location identifier (DLI) on a display; sending a request to a second device to: (1) capture the DLI displayed on the display; (2) receive inputs from at least one positioning system and the captured DLI; and (3) output a location proof using the inputs; and receiving the location proof to initiate a verification of the claimed location of the first device, wherein the location proof includes the captured DLI and a captured location.

19 Claims, 11 Drawing Sheets

(56) References Cited

U.S. PATENT DOCUMENTS

| | | | |
|---|---|---|---|
| 2013/0159008 A1* | 6/2013 | Mills | G06Q 10/06 705/2 |
| 2014/0136652 A1* | 5/2014 | Narayanaswami | H04L 67/02 709/217 |
| 2018/0157813 A1* | 6/2018 | Rodrigs | G06K 7/1417 |

* cited by examiner

CONFIRMING GEOLOCATION OF A DEVICE

CROSS-REFERENCE TO RELATED APPLICATIONS

This application claims the benefits of priority under 35 U.S.C. § 119(e) of U.S. Provisional Patent Application No. 62/670,555, filed May 11, 2018, entitled "Confirming Geolocation of a Displaying Device" and U.S. Provisional Patent Application No. 62/671,275, filed May 14, 2018, entitled "Confirming Geolocation of a Displaying Device." The disclosures of the above-referenced applications are incorporated herein by reference.

BACKGROUND

Field

The present disclosure relates to verifying a geographical location ("geolocation") of a device, and more specifically, to verifying the geolocation of a device configured without a geolocation system.

Background

A device may need to demonstrate that it is in a given geographical location. One of the most accurate but expensive solutions includes the device which implements a geolocation system. The most widely used geolocation systems employ either the Global Positioning Service (GPS) or a localization based on the presence of a set of wireless fidelity (Wi-Fi) networks.

For devices connected to the Internet, it is possible to guess a rough localization through their IP address. Unfortunately, this solution requires an IP connection and does not have great accuracy. Furthermore, the advent of Internet Protocol Version 6 (IPV6) will moot this solution.

SUMMARY

The present disclosure provides for verifying the geolocation of a device configured without a geolocation system.

In one implementation, a system for verifying that a first device is in a claimed location is disclosed. The system includes: a display onto which the first device projects or displays a device location identifier (DLI); and a mobile device configured to capture the DLI, the mobile device including a localization function application, wherein the localization function application receives inputs from at least one positioning system and the captured DLI, and outputs a location proof using the inputs.

In one implementation, the DLI is a visual indicator including one of a fixed image or short video sequence. In one implementation, the DLI is a visual indicator includes one of a fixed image or short video sequence. In one implementation, the visible indicator uniquely identifies the first device. In one implementation, the visible indicator is a Quick Response code (QR code). In one implementation, the DLI includes a visible code and a characteristic signature. In one implementation, the characteristic signature includes a set of characteristics that are inherently present in content displayed by the display including a combination of color, pixel pitch, contrast, and refresh rate. In one implementation, the characteristic signature identifies a model or model family of the first device. In one implementation, the characteristic signature includes an invisible watermark. In one implementation, the at least one positioning system includes at least one of Global Positioning System (GPS) and wireless fidelity (Wi-Fi) network systems. In one implementation, the location proof includes the captured DLI, a captured location, and a timestamp. In one implementation, the captured location is received as position coordinates from the at least one positioning system. In one implementation, the timestamp is generated by the mobile device.

In another implementation, a method for verifying that a first device is in a claimed location is disclosed. The method includes: requesting the first device to display a device location identifier (DLI) on a display; sending a request to a second device to: (1) capture the DLI displayed on the display; (2) receive inputs from at least one positioning system and the captured DLI; and (3) output a location proof using the inputs; and receiving the location proof to initiate a verification of the claimed location of the first device, wherein the location proof includes the captured DLI and a captured location.

In one implementation, the first device receives an encoded identifier from a verifier and decodes the encoded identifier to generate the DLI. In one implementation, the second device is a mobile device. In one implementation, the DLI comprises a visible code and a captured signature of the first device. In one implementation, the DLI is a visual indicator which uniquely identifies the first device. In one implementation, the method further includes extracting a device identifier and a captured signature of the first device from the DLI. In one implementation, the method further includes retrieving a first record from a device database corresponding to the device identifier, wherein the first record includes a claimed location of the first device. In one implementation, the method further includes checking whether the captured location is within a predetermined radius of the claimed location of the first device. In one implementation, the method further includes retrieving a model reference number from the first record retrieved from the device database; retrieving a second record from a signature database corresponding to the model reference number, wherein the second record includes a reference signature of the first device. In one implementation, the method further includes checking whether the captured signature is within a predefined boundary of the reference signature of the first device.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, verifying the geolocation of a device configured without a geolocation system is difficult. In some cases, a rough estimate of the geolocation using the IP address may be possible for devices with IP connections.

Certain implementations of the present disclosure provide for systems and methods for verifying the geolocation of a device configured without a geolocation system. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 1:
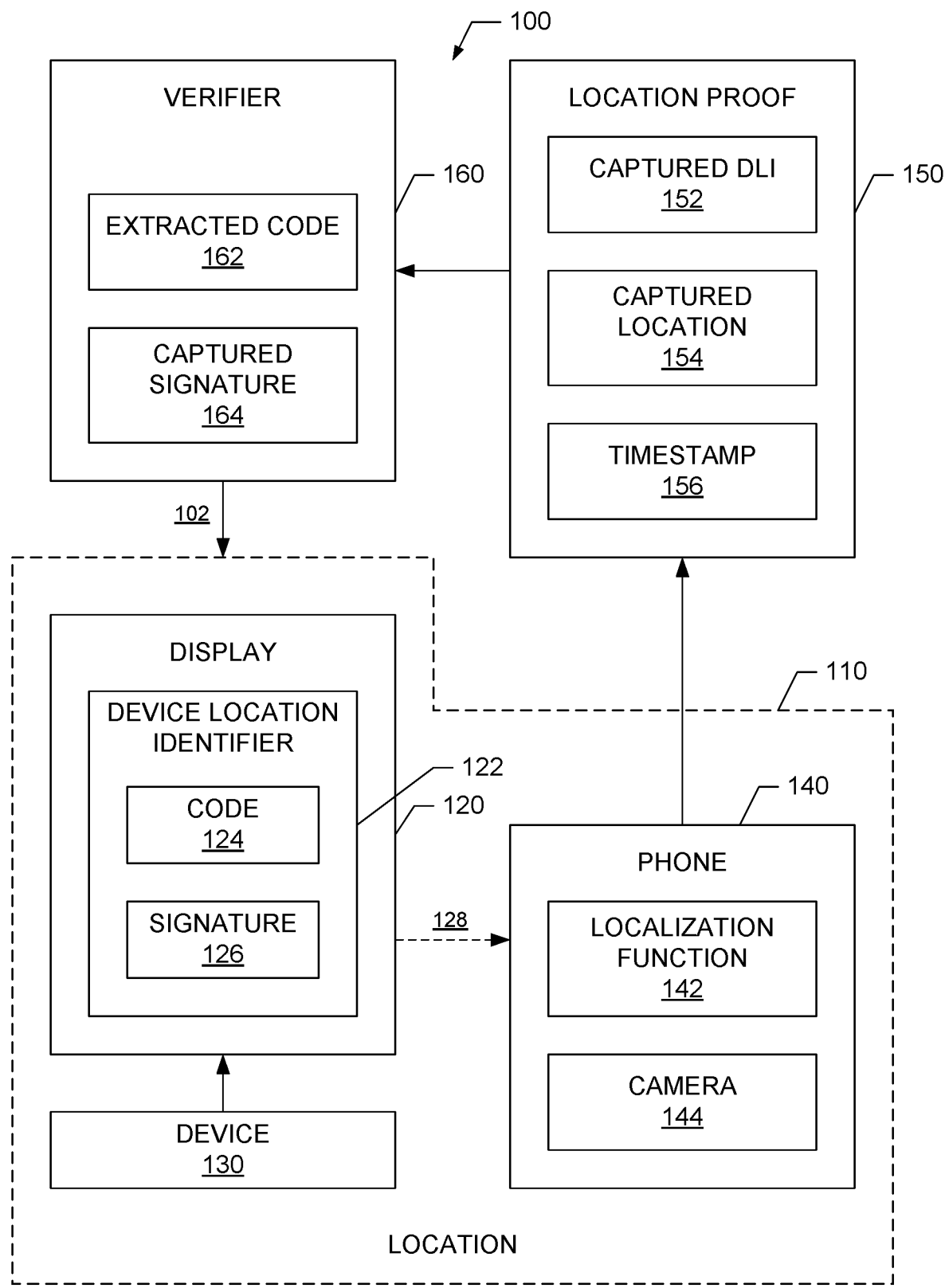
FIG. 1 is a block diagram of a system for verifying that a device is in a given claimed location in accordance with one implementation of the present disclosure.

FIG. 1 is a block diagram of a system 100 for verifying that a device 130 is in a given claimed location 110 in accordance with one implementation of the present disclosure. In the illustrated implementation of FIG. 1, the device 130 is connected to or includes a graphical display 120. The device 130 displays a device location identifier 122 on the graphical display 120. In one implementation, the device 130 displays the device location identifier 122 when a request 102 is sent to the device 130 by a verifier 160.

In one implementation, the device location identifier 122 is a visual indicator, such as a fixed image or a short video sequence. In the illustrated implementation of FIG. 1, the device location identifier 122 includes a code 124 (e.g., a visible code) and a characteristic signature 126. In other implementations, the device location identifier includes either or both the code 124 and the signature 126, and/or other visible or invisible elements.

In one implementation, the code 124 uniquely identifies the device 130. For example, the code 124 may be a textual message or Quick Response code (QR code). If the device location identifier 122 is a video sequence, then the code 124 remains constant during the sequence.

In one implementation, the characteristic signature 126 identifies the model or model family of the device 130. The characteristic signature 126 is a set of characteristics that are inherently present in the content displayed by the display 120. For example, the characteristic signature 126 may be a combination of color, pixel pitch, contrast, and refresh rate. Thus, each family of the display has unique characteristics such as color, pixel pitch, contrast, and refresh rate. In one implementation, an invisible watermark may also serve as the characteristic signature 126.

In one implementation, the user shoots or captures 128 the device location identifier 122 using a mobile device (e.g., mobile phone) 140 equipped with an integrated localization function 142 and a camera 144. In one implementation, the mobile device 140 captures the device location identifier 122 when requested by the verifier 160. In one implementation, the localization function 142 is an application (e.g., a map application) using at least one positioning system including GPS and Wi-Fi network localization systems. In another implementation, the at least one position system includes an Internet protocol (IP) geolocation system.

In the illustrated implementation of FIG. 1, the mobile phone 140 generates and outputs a location proof 150. In one implementation, the location proof 150 includes a captured device location identifier (DLI) 152, a captured location 154, and a timestamp 156. The captured DLI 152 is the recorded device location identifier 122, which may be either an image or video sequence. The captured location 154 is provided by the localization function 142. The optional timestamp 156 is generated by the mobile phone 140. In one implementation, the user launches an application (e.g., the localization function 142) residing on the mobile phone 140. The application records the captured DLI 152 using the integrated camera 144. The application receives the captured location 154 as GPS coordinates from a positioning system such as the integrated GPS receiver. The application generates and sends the location proof 150 to the verifier 160.

In the illustrated implementation of FIG. 1, the generated location proof 150 is transmitted to a verifier 160. In one implementation, the verifier 160 performs the following operations: (1) reads a code 162 (the code 124 captured by the mobile phone 140) extracted from the captured DLI 152; (2) checks whether the extracted code 162 matches the code 124 of the device 130; (3) extracts the captured signature 164 from the captured DLI 152; (4) checks whether the captured signature 164 matches the characteristic signature 126 of the device 130; and (5) checks whether the captured location 154 matches the claimed location 110 of the device 130. Optionally, the verifier 160 checks the freshness of the captured DLI 152 by verifying the timestamp 156. If all the above tests are successful, then the verifier 160 asserts that the device 130 is at its claimed location 110. The details of the operation of the verifier 160 and how and where the verifier 160 calculates and receives information about the device 130 is described in detail in conjunction with the description of FIG. 3 and FIGS. 4A through 4C.

Figure 2:
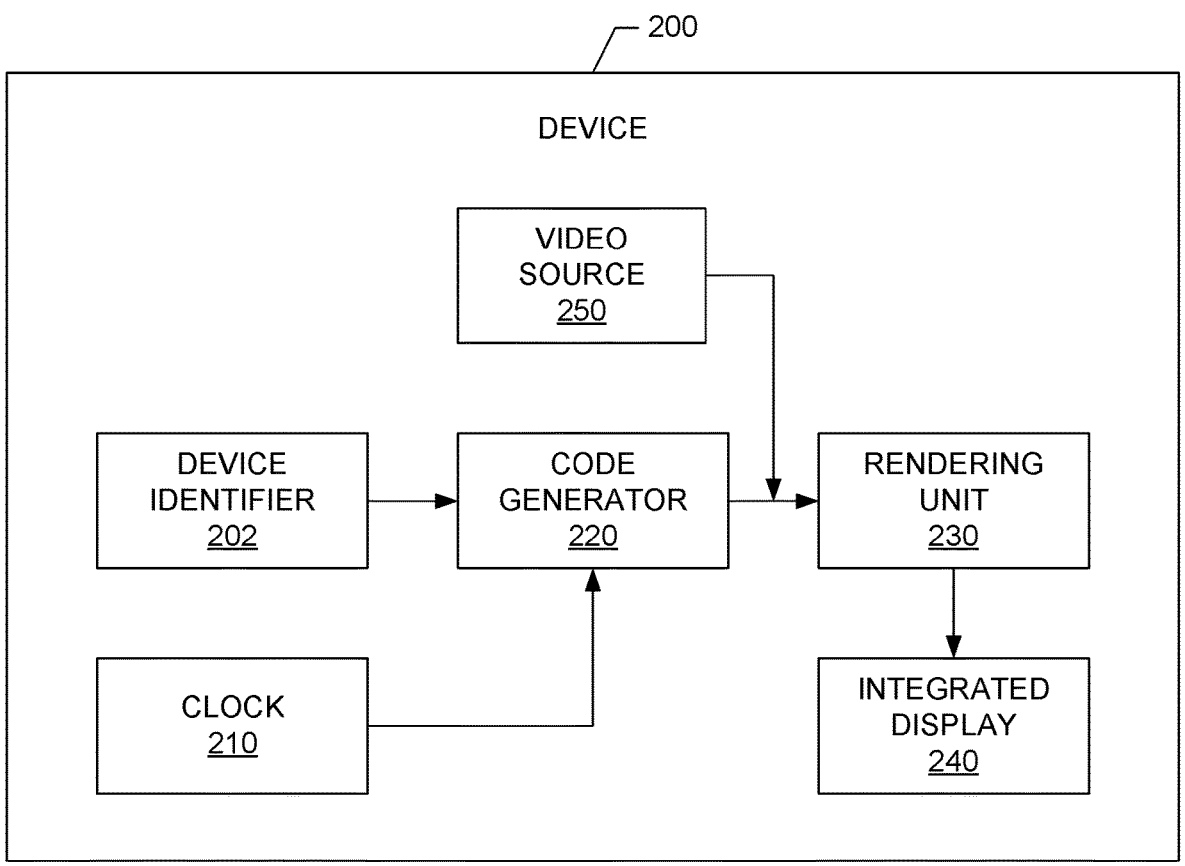
FIG. 2 is a block diagram of a device having an integrated display in accordance with one implementation of the present disclosure.

FIG. 2 is a block diagram of a device 200 having an integrated display 240 in accordance with one implementation of the present disclosure. In the illustrated implementation of FIG. 2, the device 200 includes a code generator 220, a rendering unit 230, an integrated display 240, and a video source 250 (e.g., digital).

In the illustrated implementation of FIG. 2, the rendering unit 230 renders digital video and projects or presents the rendered result on the integrated display 240. The code generator 220 graphically overlays the code 124 on the video source 250. In one implementation, the code generator 220 is a quick response (QR) code generator. In another implementation, the code generator 220 is a text inserter.

In one implementation, when the user needs to prove that the device 200 is in the expected location, the user (e.g., through the use of the verifier 160) requests the device 200 to display its device location identifier 122. Thus, the device 200 plays a given video sequence from its video source 250. The device 200 enables the code generator 220 with the value of code 124. In one implementation, the value of the code 124 is a combination of a device identifier 202 and the current time provided by an internal clock 210. In one implementation, the device 200 then displays (on the integrated display 240) the device location identifier 122 that is a video clip displaying a QR code. In another implementation, the device 200 displays a text value (e.g., a value in base64) in a known location of the display 240, rather than the QR code.

Figure 3:
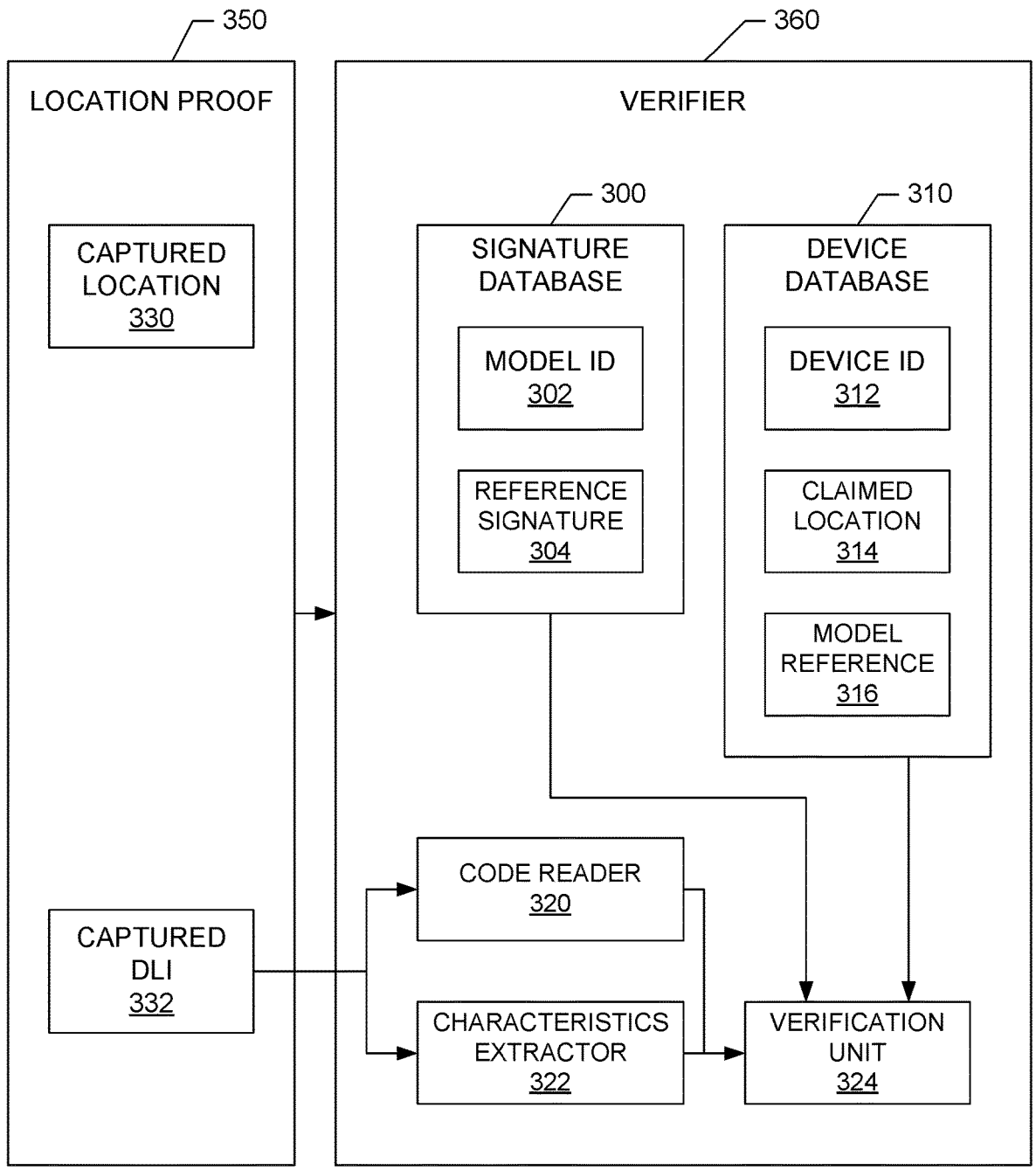
FIG. 3 is a detailed block diagram of a verifier in accordance with one implementation of the present disclosure.

FIG. 3 is a detailed block diagram of a verifier 300 in accordance with one implementation of the present disclosure. In the illustrated implementation of FIG. 3, the verifier 360 includes a signature reference database 300, a device database 310, a code reader 320, a characteristics extractor 322, and a verification unit 324.

In one implementation, the signature reference database 300 includes information about the devices, such as model ID 302 and reference signature 304. The model ID 302 is the model number of the manufacturer (may be same as the model reference 316). The reference signature 304 is the typical characteristic signature 126 for this model.

In one implementation, the device database 310 includes information for devices, such as device identifier 312, claimed location 314, and model reference 316. The device identifier 312 is the identifier for a particular device. The claimed location 314 is the GPS coordinates of the expected location for the device 200. The model reference 316 is the model number of the manufacturer of the device 200.

In one implementation, the code reader 320 is configured to extract the value of the code 124 from a video sequence, if present. If successful, the extraction returns the extracted code 162. In one implementation, the code reader 320 is a QR code reader. In another implementation, in which the code 124 is text-based, the code reader 320 is an optical character reader (OCR). In one implementation, the characteristics extractor 322 is configured to extract characteristics from a video sequence. In this implementation, the characteristics (i.e., the captured signature 164) include a refresh rate, a color histogram, an average contrast, and a measured pixel pitch. In one implementation, the verification unit 324 is configured to perform tests and to output a decision whether the device is at the expected location.

Figure 4A:
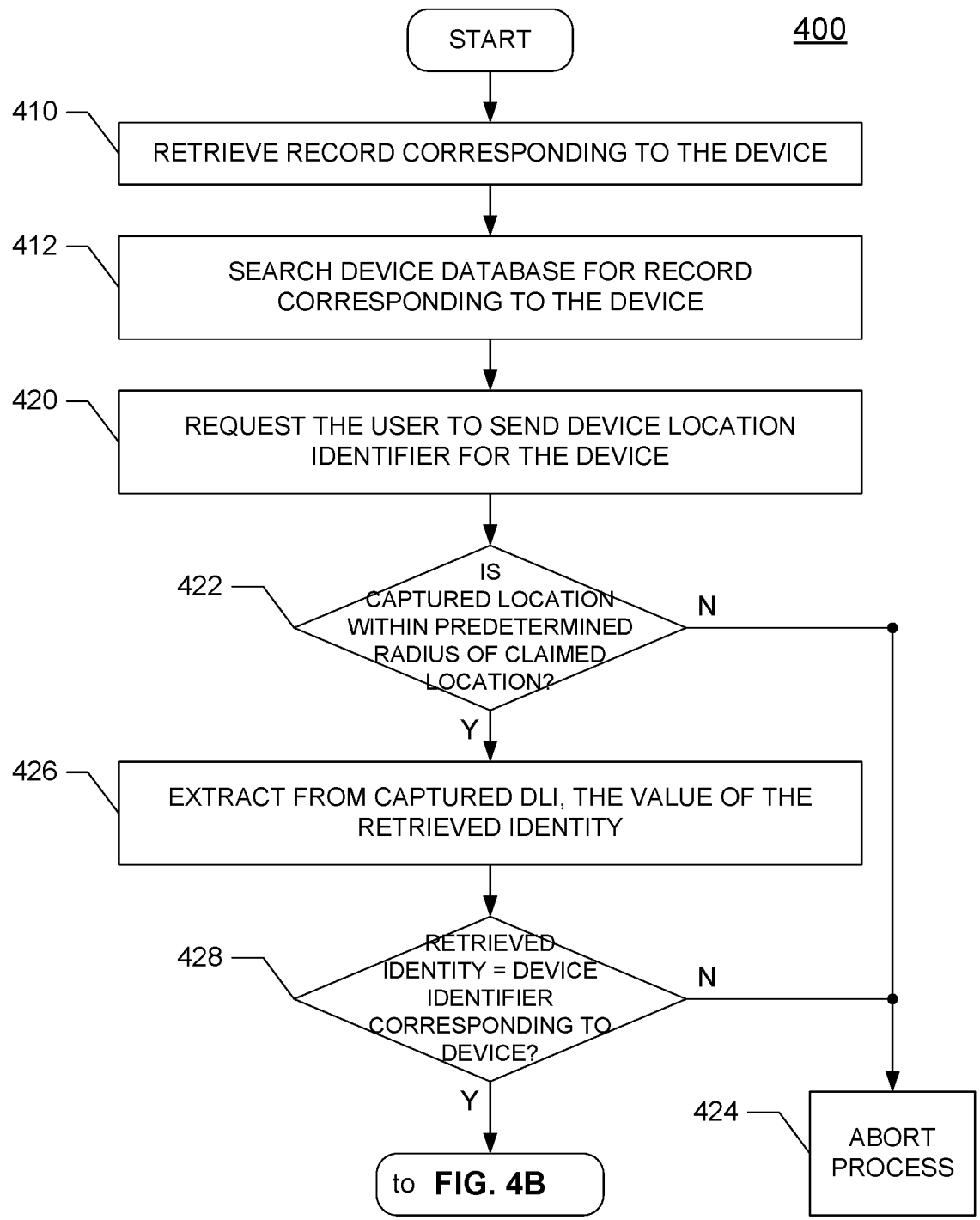
FIGS. 4A and 4B form a flow diagram of a verification process in accordance with one implementation of the present disclosure.
Figure 4B:
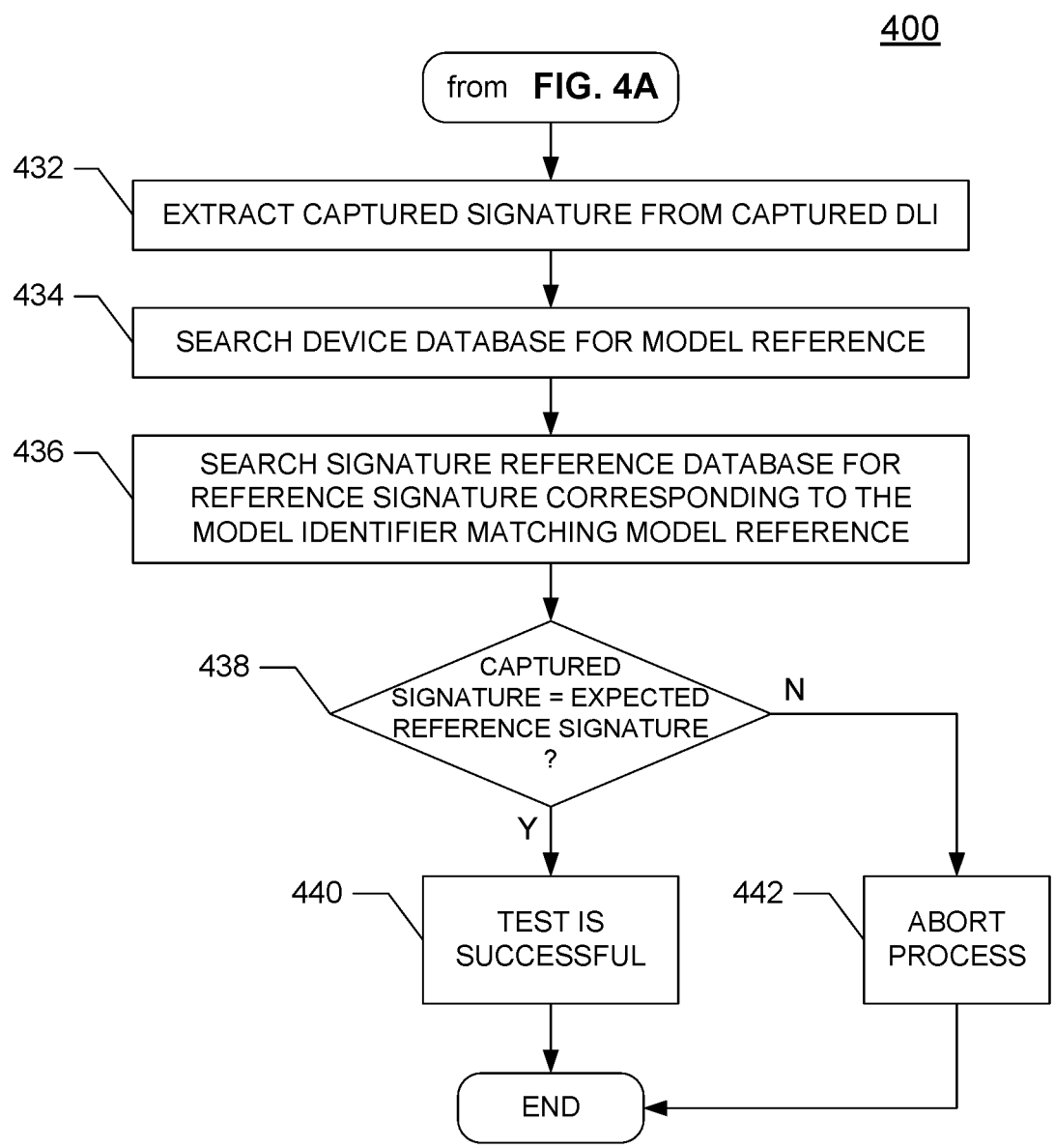

FIGS. 4A and 4B form a flow diagram of a verification process 400 in accordance with one implementation of the present disclosure. In the illustrated implementation of FIGS. 4A and 4B, at block 410, the verification unit 324 retrieves from the device database 310 the record corresponding to the assessed device 200. Since the verification unit 324 has already determined for which device 200 it needs to verify the location, the verification unit 324 searches, at block 412, the device database 310 for the record corresponding to the determined device. In one implementation, the retrieved record includes the device identifier 312, the claimed location 314, and the model reference 316 for the corresponding device 200.

At block 420, the verification unit 324 requests the user to send a device location identifier 122 for the device 200. In one implementation, the transmission of the device location identifier 122 includes sending an email and providing a return URL for uploading the captured location 330 and the captured DLI 332. The verification unit 324 checks, at block 422, if the captured location 330 is within a predetermined radius of the claimed location 314. In one implementation, the predetermined radius is 100 meters. If the captured location 330 is not within the given radius of the claimed location 314, the process is aborted, at block 424.

In one implementation, the code reader 320 extracts from the captured DLI 332, at block 426, the value of the retrieved identity (i.e., the extracted code 162), if present. The verification unit 324 then checks, at block 428, whether the retrieved identity matches the device identifier 312 corresponding to the device 200. If the retrieved identity does not match the device identifier 312, the process is aborted, at block 424.

In one implementation, the verification unit 324 validates the characteristics of the device 200. In one implementation, the characteristics extractor 322 extracts, at block 432, the captured signature 164 from the captured DLI 332. In one implementation, the verification unit 324 searches, at block 434, the device database 310 for the model reference 316 of the device 200. In another implementation, the verification unit 324 searches, at block 436, the signature reference database 300 for the reference signature 304 corresponding to the model identifier 302 matching the model reference 316. In another implementation, the verification unit 324 checks, at block 438, whether the captured signature 164 matches the expected reference signature 304. If the difference between the different parameters is within a predefined boundary, the captured signature 164 matches the expected reference signature 304 and the verification unit 324 concludes that the test is successful, at block 440. Otherwise, if the difference between the different parameters is not within the predefined boundary, the process is aborted, at block 442.

Figure 4C:
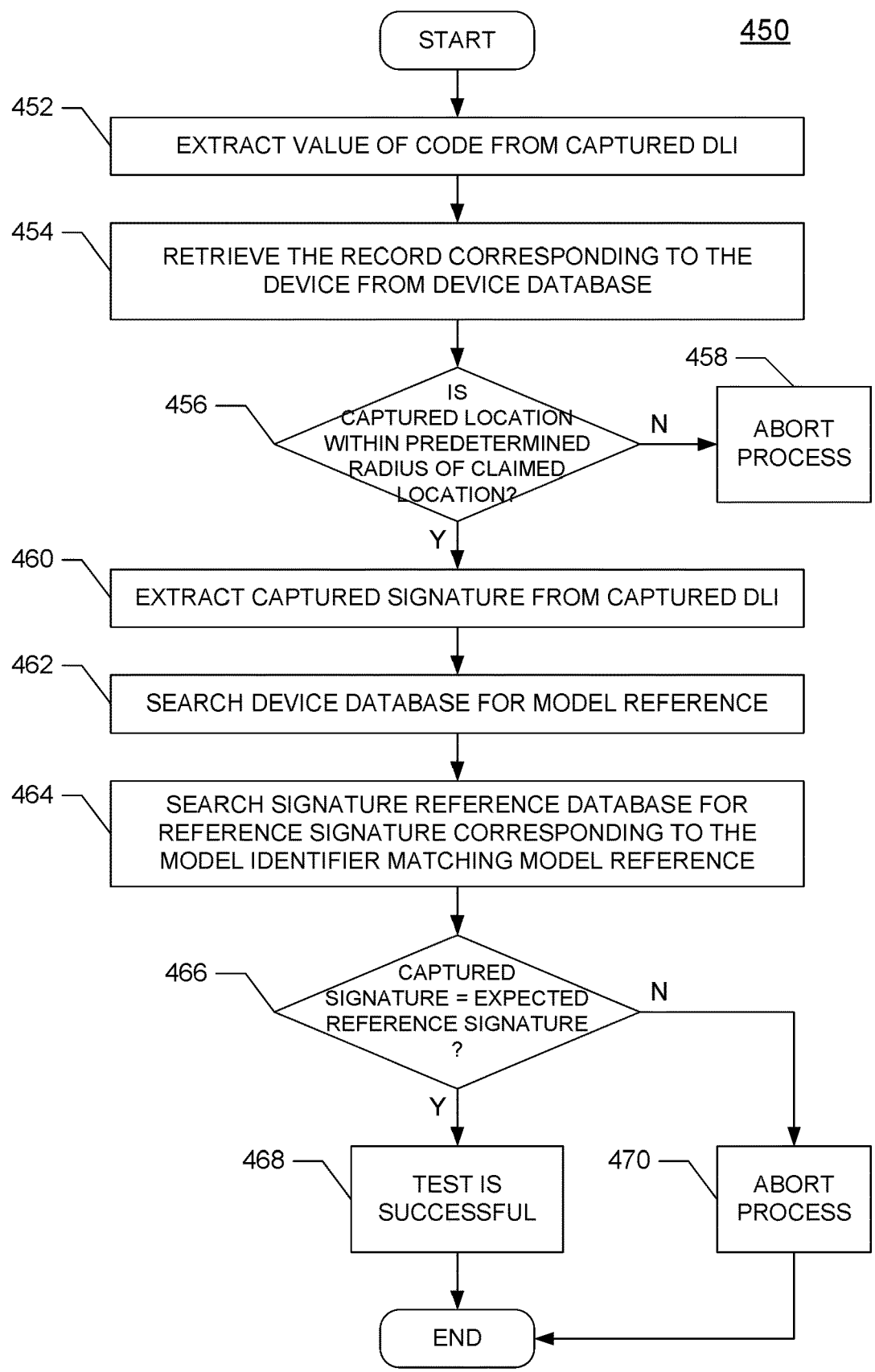
FIG. 4C is a flow diagram of a verification process in accordance with another implementation of the present disclosure.

FIG. 4C is a flow diagram of a verification process 450 in accordance with another implementation of the present disclosure. In the illustrated implementation of FIG. 4C, the user initiates the verification of the location. Thus, the user sends the captured DLI 332 directly to the verification unit 324.

In one implementation, the code reader 320 extracts, at block 452, the value of the code 124 (if present) from the captured DLI 332. The extracted code 162 corresponds to the device identifier 312 of the device 200. The verification unit 324 retrieves from the device database 310, at block 454, the record corresponding to the assessed device 200 using the extracted device identifier 312 to find the record. The verification unit 324 then checks, at block 456, if the captured location 330 is within a predetermined radius of the claimed location 314 in the record. In one implementation, the given radius is 100 meters. If the captured location 330 is not within the given radius of the claimed location 314, the process is aborted, at block 458.

In one implementation, the verification unit 324 validates the characteristics of the device 200. In one implementation, the characteristics extractor 322 extracts, at block 460, the captured signature 164 from the captured DLI 332. In one implementation, the verification unit 324 searches, at block 462, the device database 310 for the model reference 316 of the device 200. In another implementation, the verification unit 324 searches, at block 464, the signature reference database 300 for the reference signature 304 corresponding to the model identifier 302 matching the model reference 316. In another implementation, the verification unit 324 checks, at block 466, whether the captured signature 164 matches the expected reference signature 304. If the difference between the different parameters is within a predefined boundary, the captured signature 164 matches the expected reference signature 304 and the verification unit 324 concludes that the test is successful, at block 468. Otherwise, if the difference between the different parameters is not within the predefined boundary, the process is aborted, at block 470.

Figure 5:
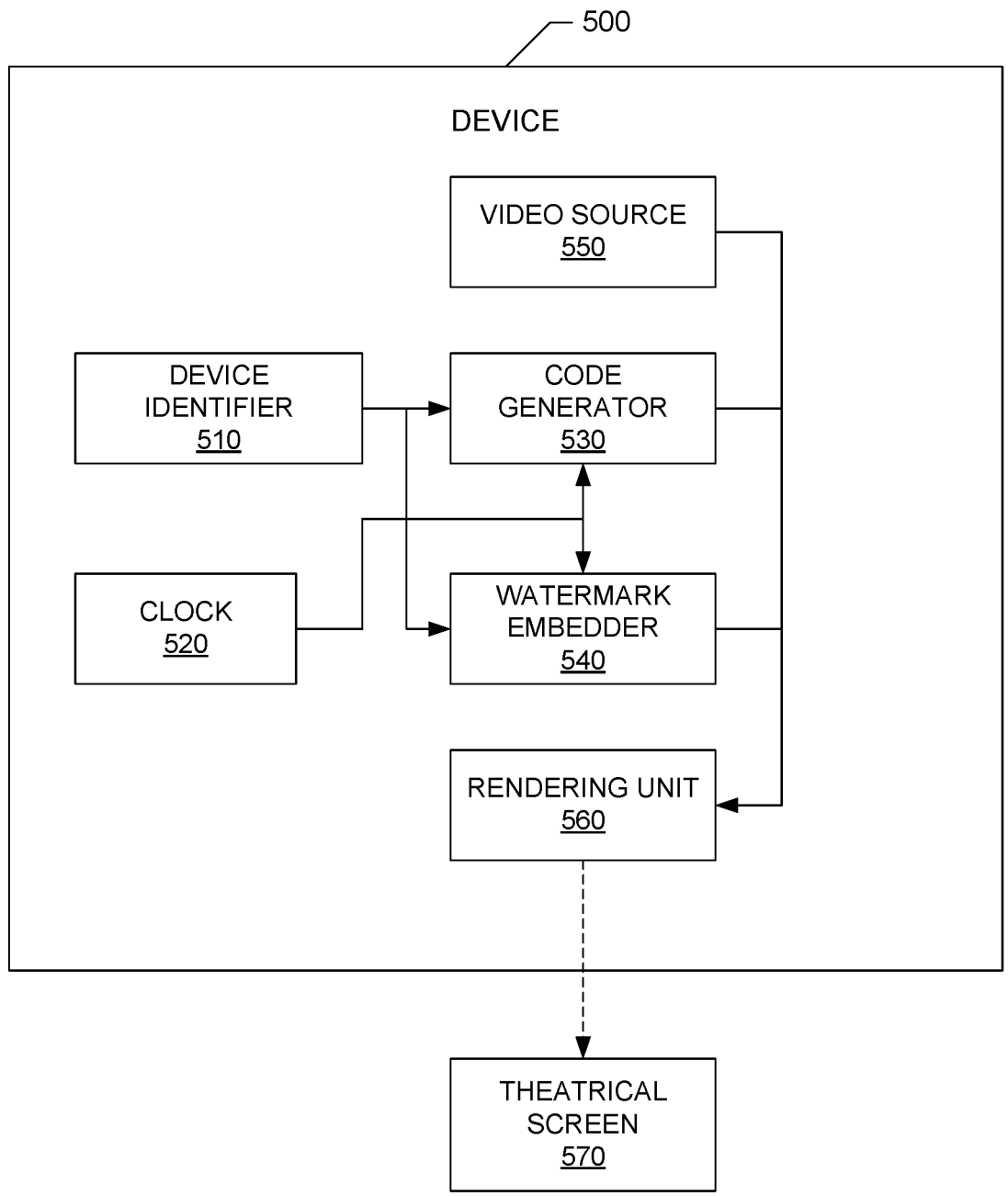
FIG. 5 is a block diagram of a device in the Digital Cinema Initiative (DCI) environment in accordance with another implementation of the present disclosure.

FIG. 5 is a block diagram of a device 500 in the Digital Cinema Initiative (DCI) environment in accordance with another implementation of the present disclosure. In FIG. 5, the device 500 is configured to enable the verification that the device 500 (e.g., a DCI projector) is in a given location.

In the illustrated implementation of FIG. 5, the device 500 includes at least a digital video source 550, a rendering unit 560, a code generator 530, and a watermark embedder 540.

The rendering unit 560 is configured to render digital video and project the rendered result on a display 570 (e.g., a theatrical screen). The code generator 530 is configured to graphically overlay the code 124 on the digital video source 550. In one implementation, the code generator 530 is a QR code generator. In another implementation, the code generator 530 is a text inserter. The watermark embedder 540 is configured to embed the watermark (e.g., invisible), which may act as the characteristic signature 126.

Figure 6:
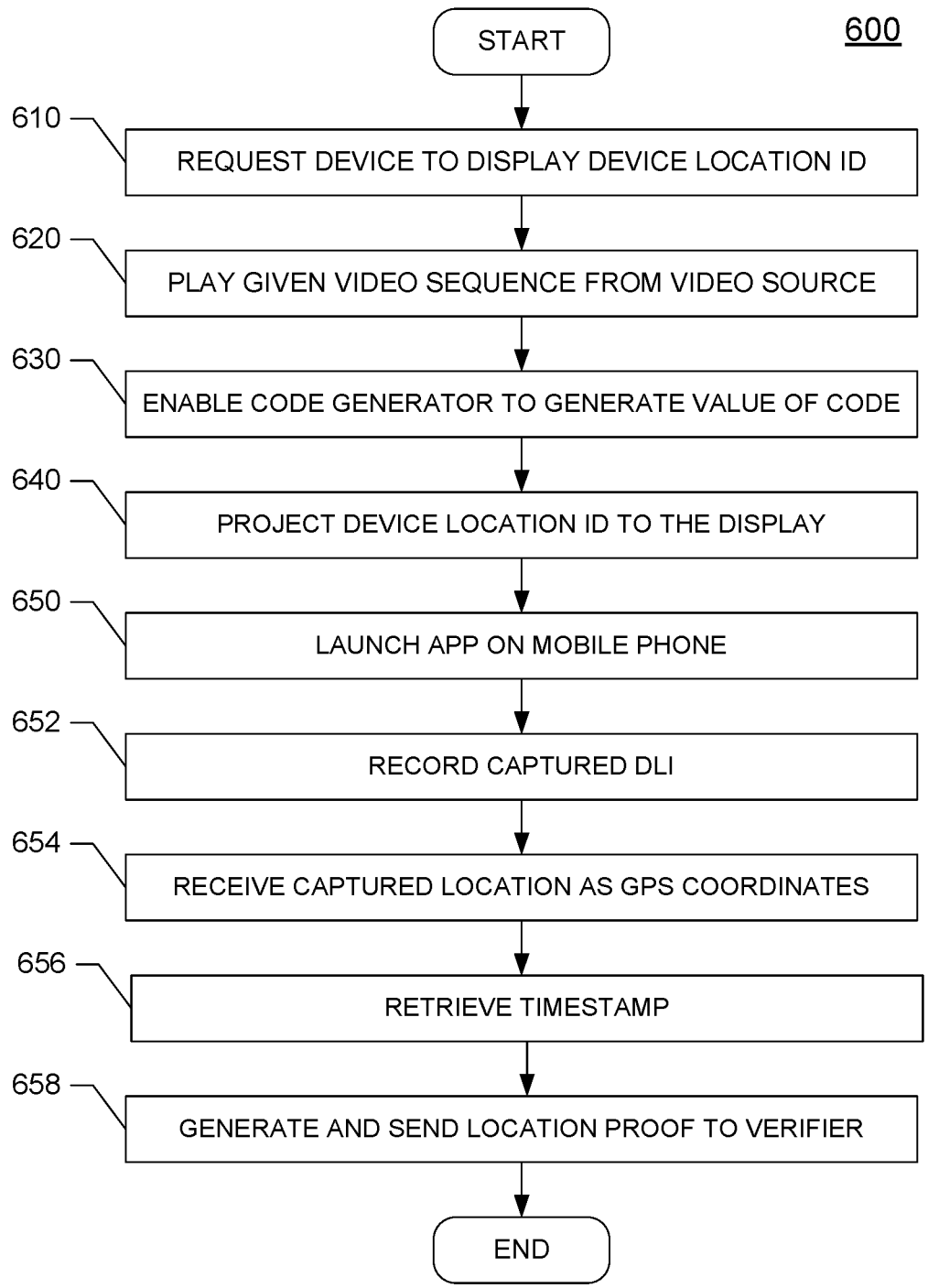
FIG. 6 is a flow diagram of a process for generating a location proof in accordance with one implementation of the present disclosure.

FIG. 6 is a flow diagram of a process 600 for generating a location proof in accordance with one implementation of the present disclosure. In the illustrated implementation of FIG. 6, when the proof of the location of the projector is needed, a request is sent, at block 610, to the device 500 to generate and display its device location identifier 122. In one implementation, the request is sent to the device 500 by the user. In another implementation, the request is sent to the device 500 by the verification unit 324 of the verifier 360. The device 500 plays, at block 620, a given video sequence from the digital video source 550. In one implementation, the device 500 enables the code generator 530, at block 630, to generate the value of the code 124. The value of the code 124 may be a combination of a device identifier 510 and the current time generated by a clock 520. In another implementation, the watermark embedder 540 uses as payload the same value as the one carried by the code 124 (e.g., the QR code) or it may be a different combination.

In illustrated implementation of FIG. 6, the device 500 projects the device location identifier 122, at block 640, to the display 570. In one implementation, the device location identifier 122 is a video clip displaying a QR code and an embedded invisible watermark with payload identical to the value of code 124. In another implementation, if the text is used rather than the QR code, then the code 124 would display a value (e.g., in base64). An application on the mobile phone 140 is launched, at block 650. The application records the captured DLI 332, at block 652, using the integrated camera 144. The application also receives the captured location 330 as GPS coordinates from the integrated GPS receiver (i.e., the localization function 142), at block 654. In one implementation, at the beginning of the recording, the application retrieves the timestamp 156 from its integrated clock, at block 656. The application then generates and sends, at block 658, the location proof 350, including the captured DLI 332, the captured location 330, and the timestamp 156, to the verifier 160.

Figure 7:
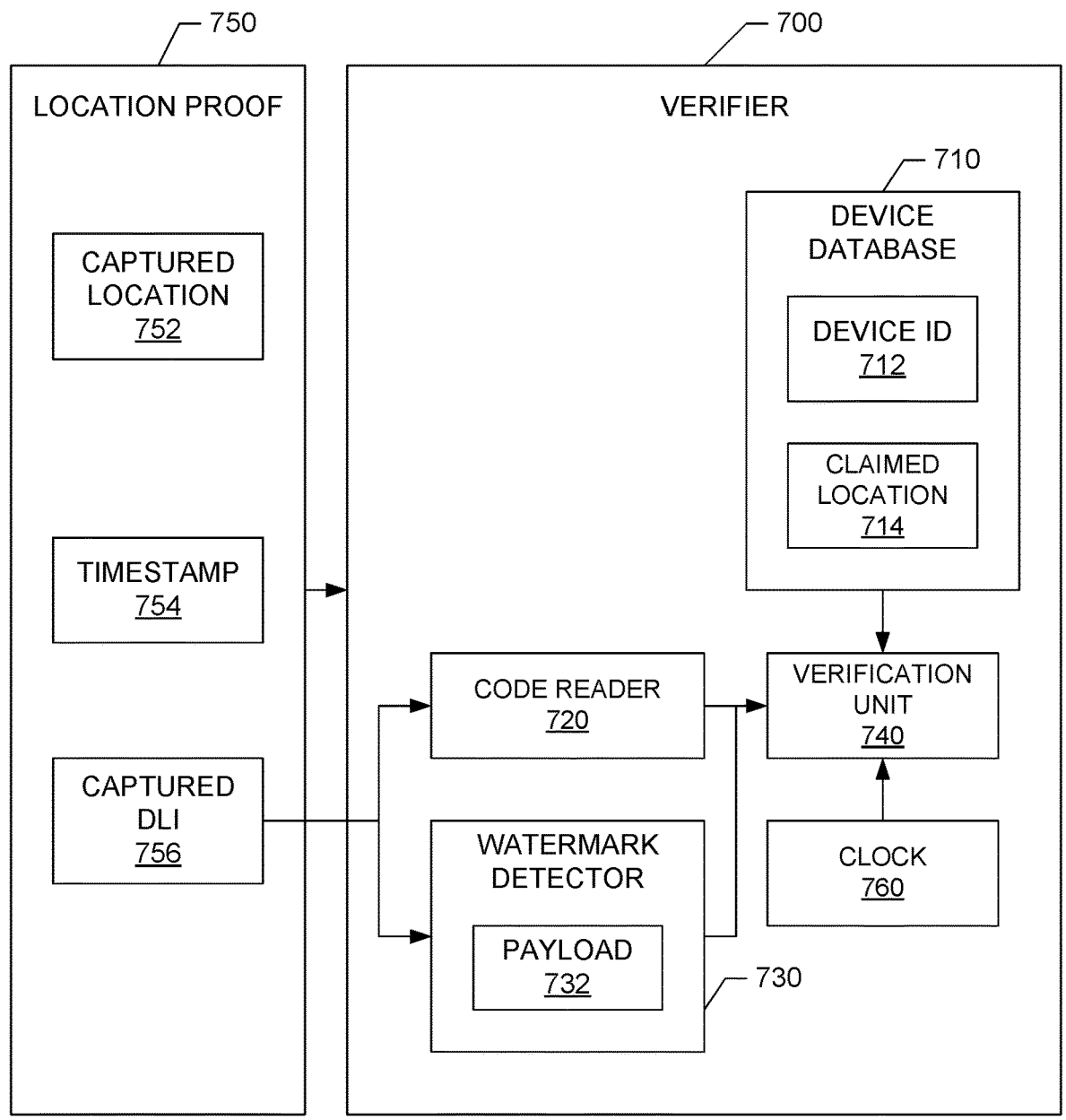
FIG. 7 is a detailed block diagram of a verifier in accordance with another implementation of the present disclosure.

FIG. 7 is a detailed block diagram of a verifier 700 in accordance with another implementation of the present disclosure. In the illustrated implementation of FIG. 7, the verifier 700 includes a device database 710, a code reader 720, a watermark detector 730, a verification unit 740, and an internal clock 760.

In one implementation, the device database 310 includes information for devices, such as device identifier 712 and claimed location 714. The device identifier 712 is the identifier for a particular device. The claimed location 714 is the GPS coordinates of the expected location (i.e., the auditorium or theater) for the device 200.

In one implementation, the code reader 720 is configured to extract the value of the code 124 from a video sequence, if present. If successful, the extraction returns the extracted code 162. In one implementation, the code reader 720 is a QR code reader. In another implementation, in which the code 124 is text-based, the code reader 720 is an optical character reader (OCR). In one implementation, the watermark detector 730 is configured to extract the watermark from the video sequence, if present. If successful, the extraction returns a payload 732. In one implementation, the verification unit 324 is configured to perform tests and to output a decision whether the device is at the expected location.

Figure 8A:
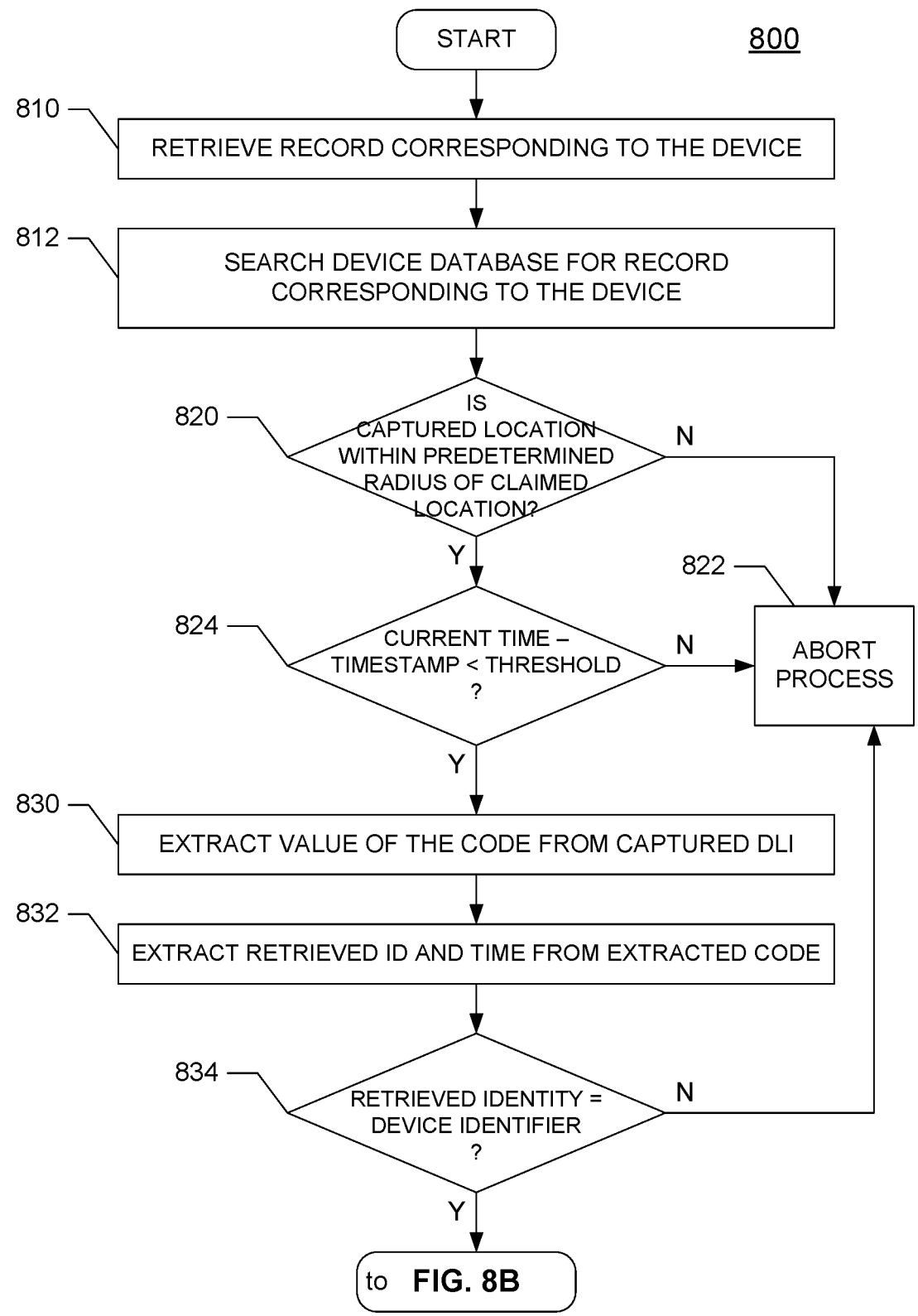
FIGS. 8A and 8B form a flow diagram of a verification process in accordance with one implementation of the present disclosure.
Figure 8B:
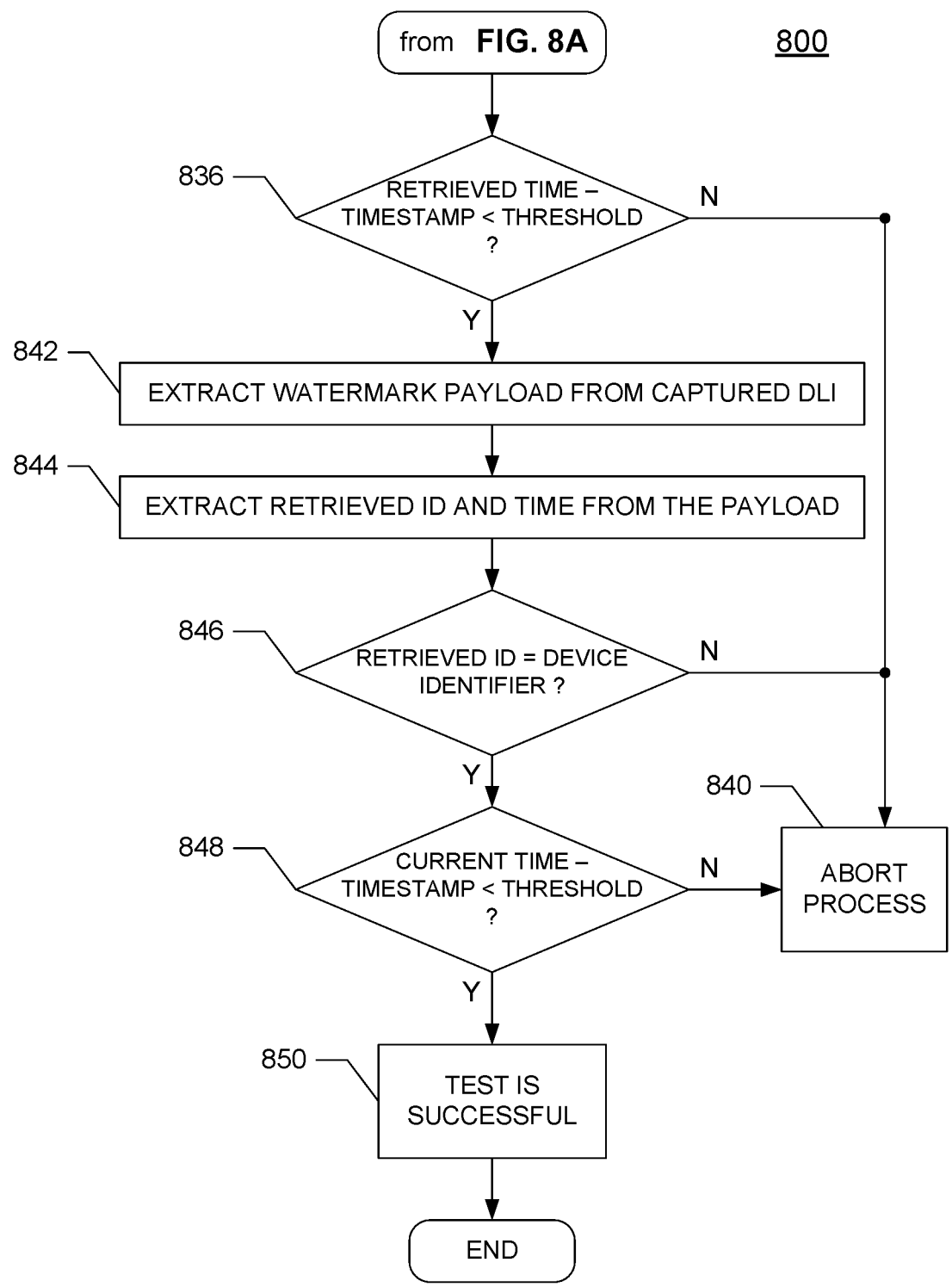

FIGS. 8A and 8B form a flow diagram of a verification process 800 in accordance with one implementation of the present disclosure. In the illustrated implementation of FIGS. 8A and 8B, the verification unit 740 retrieves from the device database 710 the record corresponding to the assessed device 500, at block 810. Since the verification unit 740 has already determined for which device 200 it needs to verify the location, the verification unit 740 searches, at block 812, the device database 710 for the record corresponding to the determined device. In one implementation, the retrieved record includes the device identifier 712 and the claimed location 714 for the corresponding device 500.

The verification unit 740 checks, at block 820, if the captured location 752 is within a predetermined radius of the claimed location 714. In one implementation, the predetermined radius is 200 meters. If the captured location 752 is not within the given radius of the claimed location 714, the process is aborted, at block 822.

The verification unit 740 checks, at block 824, if the difference between the current time of the clock 760 and the timestamp 754 is less than a given threshold. In one implementation, the threshold is the duration of captured device location identifier 756 plus two minutes. If the difference is not less than the given threshold, the process is aborted, at block 822.

In one implementation, the code reader 720 extracts from the captured DLI 756, at block 830, the value of the code 124 (i.e., the extracted code 162), if present. In one implementation, the extracted code 162 carries the identity of the device ("retrieved identity") and the time when the code 124 was generated ("retrieved time"). Thus, the verification unit 740 extracts, at block 832, the retrieved identity and retrieved time from the extracted code 162. The verification unit 740 checks, at block 834, whether the retrieved identity matches the device identifier 712. If the retrieved identity does not match the device identifier 712, the process is aborted, at block 822. The verification unit 740 then checks, at block 836, whether the difference between the retrieved time and the timestamp 754 is less than a threshold. In one implementation, the threshold is 10 minutes. To keep the difference to be less than the threshold, the user should start the mobile phone's application in less than the threshold time from starting the display device location identifier 122. Otherwise, the process is aborted, at block 840.

In one implementation, the watermark detector 530 extracts the payload 732 from the captured DLI 756, at block 842, if a watermark is present. The verification unit 740 extracts, at block 844, the retrieved identity and the retrieved time from the payload 732. The verification unit 740 checks, at block 846, whether the retrieved identity matches the device identifier 712. The verification unit 740 then checks, at block 848, whether the difference between the retrieved time and the timestamp 754 is less than a threshold. In one implementation, the threshold is 10 minutes. If the difference is less than the threshold, the verification unit 740 concludes that the test is successful, at block 850. Otherwise, the process is aborted, at block 840.

In another implementation, the value carried by the code 124 is cryptographically bound to unique and secret information embedded in the device 500. In one implementation, the code uses asymmetric encryption. Although the use of a digital signature is possible, it may increase the length of the code. In one example, the code generator 530 securely holds the private key of the device 500. The code generator 530 then encrypts the value with the private key. The code 124 carries the encrypted value. In this example, the device database 710 includes the public key of each device 500. The code reader 720 decrypts the value carried by code 124 before providing it to the verification unit 740.

In another implementation, the verifier 700 is part of the application of the mobile phone 140. In this implementation, the captured DLI 756 does not leave the mobile phone 140. The databases may be remote and accessed across a network. Other variations are also possible, such as using a different code than the QR code, or various applications, such as verifying medical imaging equipment or security cameras.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for verifying that a first device is in a given claimed location, the system comprising:
    a display onto which the first device projects or displays a device location identifier (DLI), wherein the DLI uniquely identifies the first device;
    a mobile device configured to capture the DLI, the mobile device including a localization function application,
    wherein the localization function application receives inputs from at least one positioning system and the captured DLI, and outputs a location proof including the inputs; and
    a verifier configured to: (1) receive the location proof to initiate a verification of the claimed location of the first device, wherein the location proof includes the captured DLI and a captured location; (2) extract a device identifier and a captured signature of the first device from the DLI; (3) retrieve a first record from a device database corresponding to the device identifier, wherein the first record includes a claimed location of the first device; (4) retrieve a model reference number from the first record retrieved from the device database; and (5) retrieve a second record from a signature database corresponding to the model reference number, wherein the second record includes a reference signature of the first device.

2. The system of claim 1, wherein the DLI is a visual indicator comprising one of a fixed image or short video sequence.

3. The system of claim 2, wherein the visual indicator uniquely identifies the first device.

4. The system of claim 2, wherein the visual indicator is a Quick Response code (QR code).

5. The system of claim 1, wherein the DLI comprises a visible code and a characteristic signature.

6. The system of claim 5, wherein the characteristic signature includes a set of characteristics that are inherently present in content displayed by the display including a combination of color, pixel pitch, contrast, and refresh rate.

7. The system of claim 5, wherein the characteristic signature identifies a model or model family of the first device.

8. The system of claim 5, wherein the characteristic signature includes an invisible watermark.

9. The system of claim 1, wherein the at least one positioning system comprises
    at least one of Global Positioning System (GPS) and wireless fidelity (Wi-Fi) network systems.

10. The system of claim 1, wherein the location proof comprises
    the captured DLI, a captured location, and a timestamp.

11. The system of claim 10, wherein the captured location is received as position coordinates from the at least one positioning system.

12. The system of claim 10, wherein the timestamp is generated by the mobile device.

13. A method for verifying that a first device is in a claimed location, the method comprising:

requesting the first device to display a device location identifier (DLI) on a display, wherein the DLI uniquely identifies the first device;

sending a request to a second device to: (1) capture the DLI displayed on the display; (2) receive inputs from at least one positioning system and the captured DLI; and (3) output a location proof including the inputs;

receiving the location proof to initiate a verification of the claimed location of the first device, wherein the location proof includes the captured DLI and a captured location;

extracting a device identifier and a captured signature of the first device from the DLI;

retrieving a first record from a device database corresponding to the device identifier, wherein the first record includes a claimed location of the first device;

retrieving a model reference number from the first record retrieved from the device database; and retrieving a second record from a signature database corresponding to the model reference number, wherein the second record includes a reference signature of the first device.

14. The method of claim 13, wherein the first device receives an encoded identifier from a verifier and decodes the encoded identifier to generate the DLI.

15. The method of claim 13, wherein the second device is a mobile device.

16. The method of claim 13, wherein the DLI comprises a visible code and a captured signature of the first device.

17. The method of claim 13, wherein the DLI is a visual indicator which uniquely identifies the first device.

18. The method of claim 13, further comprising
checking whether the captured location is within a predetermined radius of the claimed location of the first device.

19. The method of claim 13, further comprising
checking whether the captured signature is within a predefined boundary of the reference signature of the first device.

* * * * *